US012497210B2

(12) United States Patent
Mount et al.

(10) Patent No.: US 12,497,210 B2
(45) Date of Patent: Dec. 16, 2025

(54) END CAP WITH SCORE LINE FOR CONTROLLED FLAP OPENING AND METHOD THEREFOR

(71) Applicants: Ricky Allen Mount, Centerville, OH (US); Ancil Louis Lackey, Oklahoma City, OK (US); Richard L. Wise, Yukon, OK (US)

(72) Inventors: Ricky Allen Mount, Centerville, OH (US); Ancil Louis Lackey, Oklahoma City, OK (US); Richard L. Wise, Yukon, OK (US)

(73) Assignee: RAM SOLUTIONS LLC, Dayton, OH (US)

( * ) Notice: Subject to any disclaimer, the term of this patent is extended or adjusted under 35 U.S.C. 154(b) by 122 days.

(21) Appl. No.: 18/126,601

(22) Filed: Mar. 27, 2023

(65) Prior Publication Data

US 2024/0327064 A1 Oct. 3, 2024

(51) Int. Cl.
*B65D 17/28* (2006.01)
*B26D 3/08* (2006.01)

(52) U.S. Cl.
CPC ............. *B65D 17/404* (2018.01); *B26D 3/08* (2013.01); *B65D 17/4012* (2018.01); *B65D 2517/0014* (2013.01)

(58) Field of Classification Search
CPC .............. B65D 17/404; B65D 17/4012; B65D 2517/0014; B26D 3/08
USPC .......................................................... 220/269
See application file for complete search history.

(56) References Cited

U.S. PATENT DOCUMENTS 4,105,133 A * 8/1978 La Barge ........... B65D 51/1677 215/253
5,375,729 A 12/1994 Schubert
5,692,636 A 12/1997 Schubert
5,738,237 A * 4/1998 McEldowney .... B65D 17/4012 220/269
5,860,553 A 1/1999 Schubert
6,129,230 A * 10/2000 Turner ............... B65D 17/4012 220/269
6,715,629 B2 4/2004 Hartman et al.
6,761,281 B2 7/2004 Hartman
8,783,496 B2 7/2014 Neiner et al.
9,033,175 B2 5/2015 Frank
9,573,724 B2 2/2017 Mitchell et al.
9,580,203 B2 2/2017 Frank
9,694,935 B2 7/2017 Scott
9,938,043 B2 * 4/2018 Chasteen ........... B65D 17/4012
10,384,830 B2 8/2019 Mitchell et al.
(Continued)

OTHER PUBLICATIONS

U.S. Patent Office, International Search Report and Written Opinion, issued Aug. 27, 2024, which pertains to PCT Application No. PCT/US2024/021590. 10 pgs.

*Primary Examiner* — James N Smalley
(74) *Attorney, Agent, or Firm* — Thompson Hine LLP

(57) ABSTRACT

An end cap including an end cap body made of a relatively thin metal material. The end cap has a main score line formed in the end cap body and defining a flap area. The end cap further includes a tab coupled to the end cap body and having an end positioned adjacent to the flap area. The end cap has a control score line positioned adjacent to the main score line, where the control score line is curved or arcuate along at least part of its length, and has end portions that are parallel or substantially parallel.

21 Claims, 6 Drawing Sheets

(56) References Cited

U.S. PATENT DOCUMENTS

| | | | |
|---|---|---|---|
| 10,479,551 | B2 | 11/2019 | Frank |
| 10,632,520 | B2 | 4/2020 | Rayburn |
| 11,485,539 | B2 | 11/2022 | Frank |
| 2002/0113069 | A1 | 8/2002 | Forrest et al. |
| 2014/0263333 | A1 | 9/2014 | Keane et al. |
| 2016/0023821 | A1 | 1/2016 | Jacober et al. |
| 2020/0102117 | A1 | 4/2020 | Frank |

* cited by examiner

END CAP WITH SCORE LINE FOR CONTROLLED FLAP OPENING AND METHOD THEREFOR

The present invention relates to an end cap for a container having a score line, and more particularly to an end cap having a score line for providing controlled opening of a flap of the end cap.

BACKGROUND

Containers and vessels, such as aluminum and other metal cans, are often used for storing fluid, such as carbonated and/or pressurized liquids. The containers may include a flap that can be opened when it is desired to dispense the contents of the container. In particular the container can include a tab that is coupled to the body of the container by a rivet, and the tab is manually lifted by a user to apply a leveraged force to the flap, and thereby open the flap. However the contents of the container can in some cases be under relatively high pressures, which can cause the flap to open under uncontrolled conditions (e.g. causing the flap to open upwardly).

SUMMARY

In one embodiment, the invention is an end cap including an end cap body made of a relatively thin metal material. The end cap has a main score line formed in the end cap body and defining a flap area. The end cap further includes a tab coupled to the end cap body and having an end positioned adjacent to the flap area. The end cap has a control score line positioned adjacent to the main score line, where the control score line is curved or arcuate along at least part of its length, and has end portions that are parallel or substantially parallel.

DETAILED DESCRIPTION

FIGS. 1-4 illustrates a lid or end cap 10 that can be coupled to and/or form part of a container body, as will be described in greater detail below. The end cap 10 can include or be made of an end cap body 11 made of a relatively flat, sheet-like thin piece of sheet-like material, including metals such as aluminum, aluminum alloys, steel, etc. The end cap body 11 can be relatively thin and planar, having thickness of between about 8/1000" and about 8.5/1000" in one case. The end cap body 11 can more particularly have a thickness of less than about 15/1000" in one case, and less than about 10/1000" in another case, and greater than about 6/1000" in yet another case, and in one case has a thickness between about 6/1000" and about 10/1000".

Figure 2:
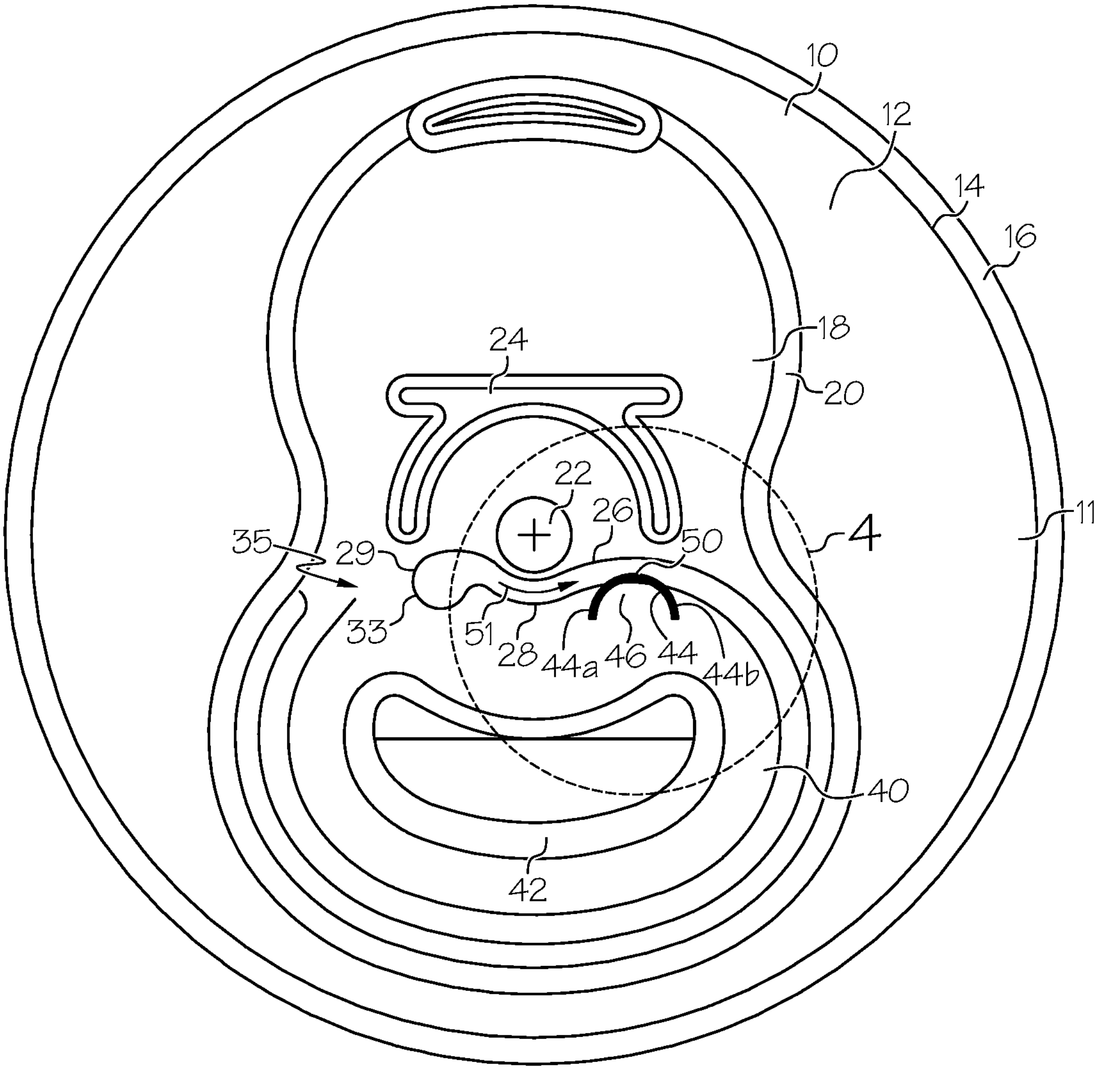
FIG. 2 is a top view of the end cap of FIG. 1, with the tab removed.
Figure 3:
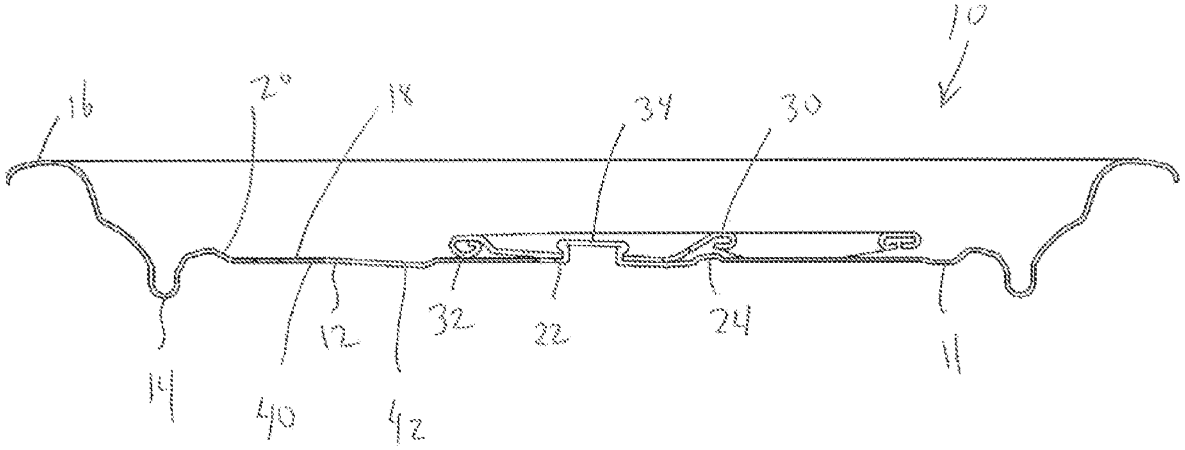
FIG. 3 is a cross section of the end cap of FIG. 1, taken along line 3-3.

The end cap 10/end cap body 11 can be generally circular in top view so that the end cap 10 can be coupled to a generally cylindrical container body, but can have other shapes as desired. The end cap 10/end cap body 11 can in one case have a center panel 12, a tapered countersink groove 14 extending about an outer perimeter thereof, and an outer curl portion 16 configured to fit about and be coupled to an upper flange of the container body (not shown). The end cap 10/end cap body 11 can further have a deboss panel or depressed area 18, defined by a downwardly angled chamfer portion or edge 20. With reference to FIG. 2, end cap 10/end cap body 11 can include a rivet-receiving section 22 and can also include an embossed area 24 extending partially circumferentially about the rivet-receiving section 22. The embossed area 24 can be termed a cent bead or a picnic table bead, and can provide stiffness to the area around the rivet-receiving section 22.

Figure 1:
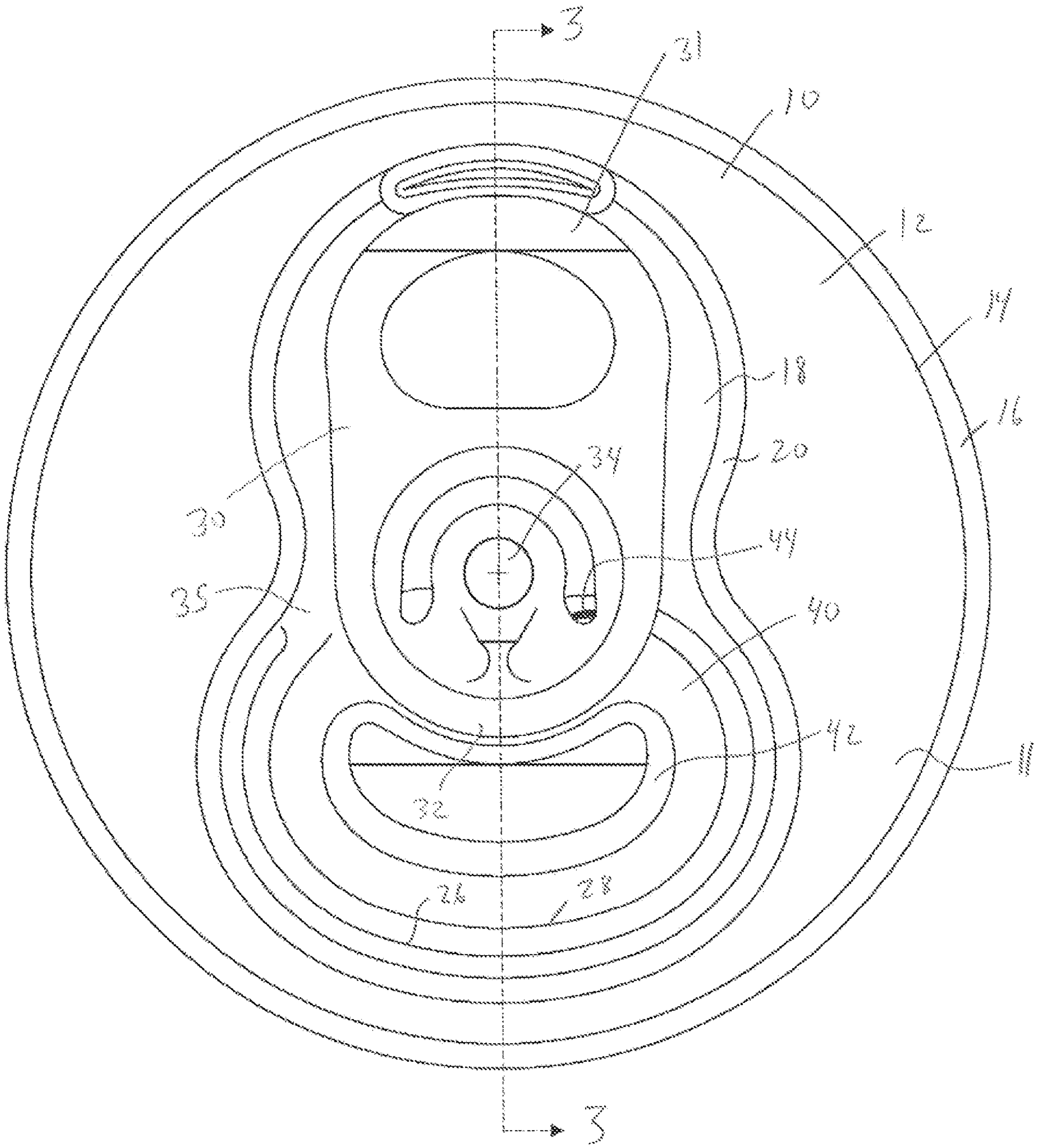
FIG. 1 is a top view of an end cap.

The end cap 10 can also have a main score line 26 and an anti-fracture score line 28 formed therein. The main score line 26 extends in a nearly closed loop shape in top view, having a generally "kidney bean" shape in the illustrated embodiment and defining a flap or flap area 40 therein. The flap 40 can also include a debossed section or a down bead 42 located in a center area of the flap 40 to provide increased stiffness to the flap 40. In the embodiment of FIGS. 1 and 2 the main score line 26 does not form a complete loop but leaves a gap, landed area or hinge area 35 through which the main score line 26 does not extend. The main score line 26 in one case extends circumferentially between about 330° to about 350°, such that the hinge area 35 in one case extends circumferentially between about 10° and about 30°.

The end cap 10 can have a tab 30, having an end/tip 32, coupled to the center panel 12 of the end cap 10 via a rivet 34, but the tab 30 can be coupled to the end cap 10/end cap body 11/center panel 12 by various other devices and mechanisms. The back end 31 of tab 30 is configured to be manually raised and thereby pivot the tab 30 about the rivet 34 about an axis parallel to the plane of the end cap 10, pushing the forward tip/end 32 of the tab 30 downwardly into the flap area 40. The flap 40 is then formed and folded downwardly about the hinge area 35 into the container body, as the main score line 26 tears or fractures along its length, thereby forming an opening through which the contents of the container can be dispensed.

Figure 5:
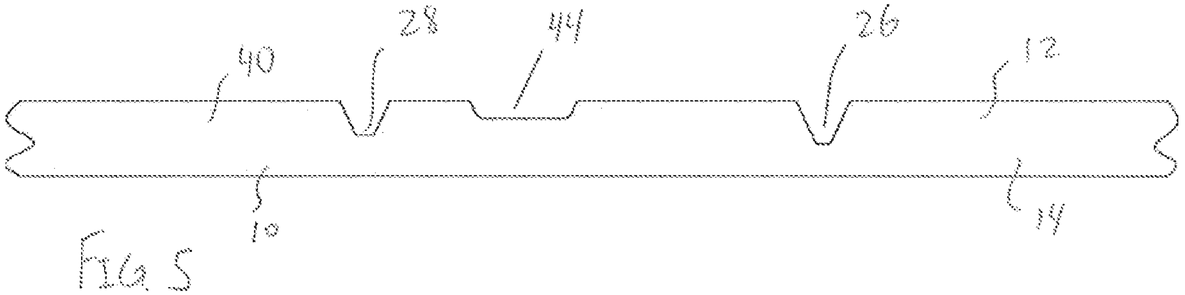
FIG. 5 is a cross section taken along line 5-5 of FIG. 4.

As shown in FIG. 5, the main score line 26 can be a cut or area of displaced/removed material formed in the thickness of the end cap 10. The main score line 26 is shown as having angled side walls and a straight/flat bottom edge, but can have other shapes as desired, including straight side walls in one case. The main score line 26 can have a generally constant depth, but in some cases, the main score line 26 can have a shallower depth (and thicker residual) in certain areas, for example in one case to define a check slot region which slows the propagation of the tearing of the main score line 26, and can also have varying depths at other areas. In one case, where the end cap 10 has a thickness of between about 8/1000" and about 8.5/1000", the main score line 26 can have an average and/or median depth of between about 4/1000" and about 6/1000". The main score line 26 can in one case, extend an average and/or median depth between about 50% and about 75% of a thickness of the end cap 10/end cap body 11, in that case leaving a residual thickness of between about 25% and about 50%.

The anti-fracture score line 28 is formed in the end cap 10/end cap body 11/center panel 12, and extends parallel or generally parallel to the main score line 26 in top view. In the illustrated embodiment the anti-fracture score line 28 is positioned radially inside the main score line 26, but in other cases can be located radially outside the main score line 26, or in yet another case anti-fracture score lines 28 can be located both radially inside and outside the main score line 26. The anti-fracture score line 28 is, in one case, maintained a generally constant distance from the main score line 26 to be parallel to the anti-fracture score line 28 and does not intersect the main score line 26. The anti-fracture score line 28 extends in one case along the main score line 26 at least about 90% of a length of the main score line 26, and extends along the entirety of the length of the main score line 26 in the illustrated embodiment. The main score line 26 and anti-fracture score line 28 can extend to a score loop 29 (FIG. 2), and join/meet at an intersection point 33.

The anti-fracture score line 28 can be a cut or area of displaced or removed material formed in the thickness of the end cap 10, and in the illustrated embodiment has angled side walls and a straight/flat bottom edge, but can have other shapes as desired, including straight side walls. The anti-fracture score line 28 can have a generally constant depth, but in some cases, can have a shallower depth (and thicker residual), or vice versa, in certain areas as desired. The anti-fracture score line 28 can be formed at the same time as formation of the main score line 26, and can be provided to reduce stresses in the end cap 10 and/or main score line 26 during formation of the main score line 26.

In one case, where the end cap 10 has a thickness of between about $^{8}/_{1000}$" and about 8.5/1000", the anti-fracture score line 28 can have an average and/or median depth of between about $^{4}/_{1000}$" and about 4.5/1000". In one case, the anti-fracture score line 28 has a lesser depth (and thus greater residual thickness) than the main score line 26, and in one case extends (average or median) between about 40% and about 60% of a thickness of the end cap material, leaving a residual thickness of between about 40% and about 60%. The anti-fracture score line 28 can in some cases have an average and/or median depth that is between about 50% and about 80% of the depth of the main score line 26.

The end cap 10/end cap body 11/center panel 12 can include a control score line 44 positioned adjacent to the main score line 26 and/or anti-fracture score line 28. Like the main score line 26 and the anti-fracture score line 28, and with reference to FIGS. 5 and 6, the control score line 44 can be a cut or area of displaced or removed material formed in the thickness of the end cap 10, and can have angled and/or straight side walls and a flat bottom edge, but can have other shapes as desired. In one case, where the end cap 10 has a thickness of between about $^{8}/_{1000}$" and about 8.5/1000", the control score line 44 can have a fixed, average, deepest and/or median depth of between about $^{1}/_{1000}$" and about $^{2}/_{1000}$". In one case, the control score 44 has a lesser depth (and thus greater residual thickness) than the main score line 26 and/or anti-fracture score line 28, and in one case has a fixed, average, deepest and/or median depth between about 10% and about 30% of a thickness of the end cap 10, and in another case have an average and/or median depth of between about 20% and about 40% of the depth of the main score line 26.

The control score line 44 can be positioned adjacent to the main score line 26 such that, in one case, the shortest distance between the main score line 26 and the control score line 44 is less than about $^{40}/_{1000}$", or in another case less than about $^{30}/_{1000}$", or in yet another case less than about $^{20}/_{1000}$". On the other hand the control score line 44 can be positioned such that the shortest distance between the main score line 26 and the control score line 44 is greater than about $^{5}/_{1000}$" in one case, or greater than about $^{10}/_{1000}$" in another case. The control score line 44 should be positioned sufficiently close to the main score line 26 so that the control score line 44 can provide the retarding effect upon tearing of the main score line 26 as described in greater detail below, but should not be positioned so close to the main score line 26 as to risk any tearing of the main score line 26 propagating into the control score line 44. The control score line 44 can also be spaced away from the check slot region of the main score line 26.

In the illustrated embodiment the control score line 44 intersects the anti-fracture score line 28 (twice) and extends transversely (twice) across the anti-fracture score line 28. In other words in one case differing portions of the control score line 44 are located on both sides of the anti-fracture score line 28, and the control score line 44 extends from one side of the anti-fracture score 28 line to the other side of the anti-fracture score line 28. In the illustrated embodiment the control score line 44 does not intersect the main score line 26.

The control score line 44 can, in one case, have a width (in a direction parallel to a plane of the end cap 10, at the top of the control score line 44 adjacent the plane of the end cap) that is greater than the width of main score line 26 and/or anti-fracture score line 28. In particular, in one case the control score line 44 has a width between about $^{8}/_{1000}$" and about $^{12}/_{1000}$". The control score line 44 can have a width that is at least about 1.5 times greater in one case, or at least about double in another case, the width of the main score line 26 and/or anti-fracture score line 28.

Figure 4:
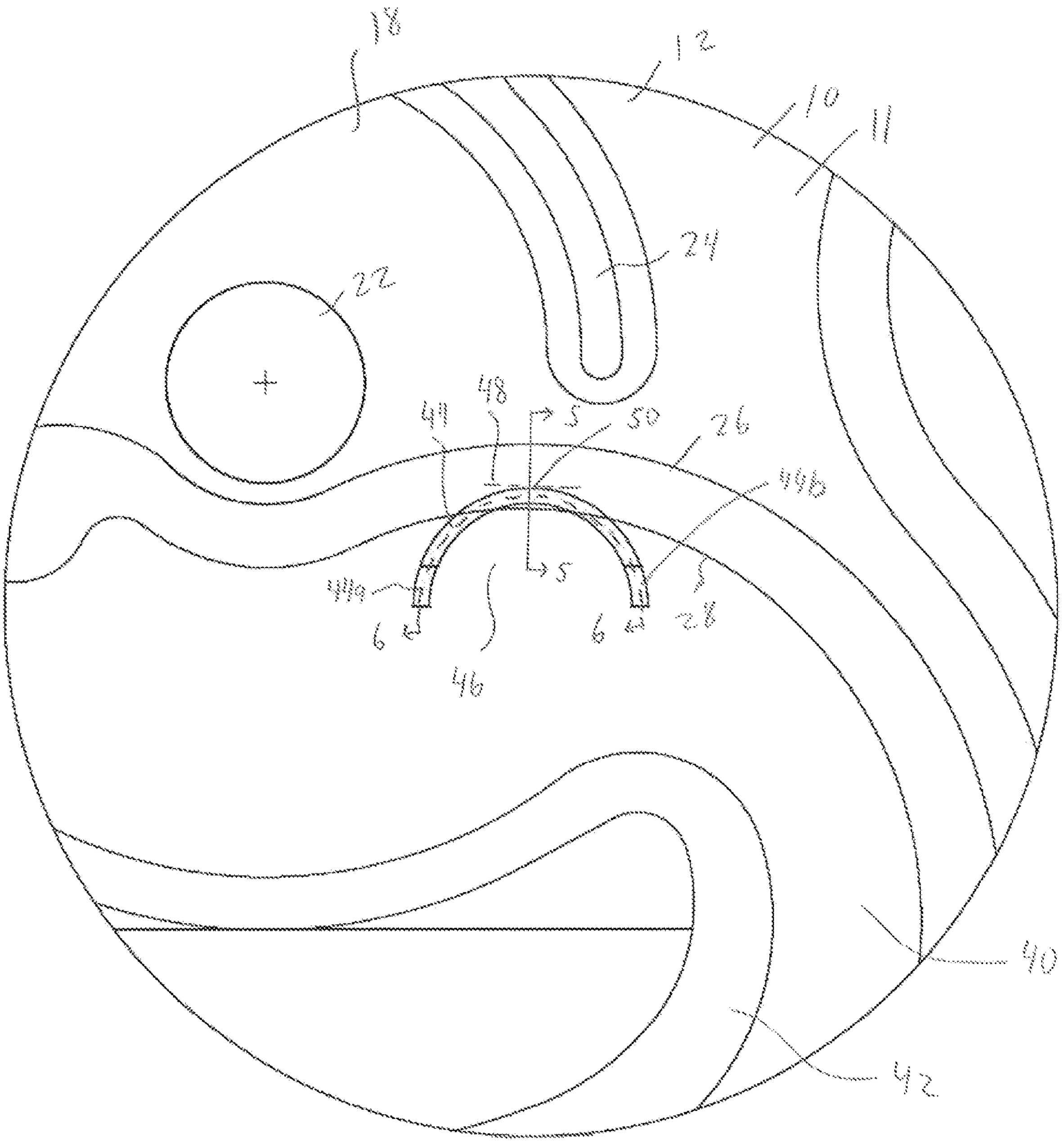
FIG. 4 is a detail view of the area indicated in FIG. 2.

As shown in FIG. 4, the control score line 44 can be curved (including oval or elliptical) or circular/arcuate in top view along at least part or an entirety of its length in top view. In the illustrated embodiment the control score line 44 is curved or arcuate along its entire or substantially its entire length (e.g. at least about 75% of its length in one case, and along at least about 90% of its length in another case). In the illustrated embodiment the control score line 44 is semicircular or substantially semicircular (extending at least about 90 degrees in one case, or at least about 120 degrees in another case, or at least about 180 degrees in another case) in top view, having spaced apart end portions (or tangents thereof) 44*a*, 44*b* that can be parallel or substantially parallel (in one case, within about +/−10 degrees of parallel). In one case the control score line 44 can have a radius (when the control score line 44 is semicircular) of between about 0.02 inches and about 0.15 inches and have a length in one case between about 0.06 inches and about 0.47 inches.

Having a control score line 44 that is semi-circular or substantially semi-circular, and/or with parallel or substantially parallel ends, can provide certain advantages. In particular, the control score line 44 defines a stub portion 46 therein (having a substantially hemispherical shape in the illustrated embodiment). In some cases it may be desired to ensure the stub portion 46 is relatively defined and stiff to ensure that the areas of the end cap 10/end cap body 11 adjacent to the stub portion 46 do not flex during tearing along the main score line 26. If the control score line 44 were not semi-circular or substantially semi-circular, and/or has ends that are not parallel or substantially parallel, and in one case has ends that flare sufficiently outwardly, the stiffness of the stub portion 46 can be compromised and decreased since the stub portion 46 is not well contained/defined. This means that areas adjacent to the main score line 26 are weaker and can lead to undesired tearing at areas propagating away from the main score line 26 and/or less controlled tearing along the main score line 26 may result.

In the embodiment of FIG. 4, the control score line 44 is positioned generally radially inside the anti-fracture score line 28 and entirely radially inside the main score line 26, and configured such that a tangent line 48 (FIG. 4) of a center 50 (along the length) of the semicircle is oriented parallel or substantially parallel (e.g. in one case within +/−10° of parallel) to the portion of the anti-fracture score line 28 and/or main score line 26 adjacent or closest to the center 50 of the semicircle/the tangent line 48 (where in one case, for making parallel determinations, curved/nonlinear segments of the score lines 26, 28 can be defined by a best fit straight line (using a least square model in one case) extending about 25% of a length of the control score line 44, or in another case extending about 10% of a length of the control score line 44). Thus each end 44*a*, 44*b* of the control score line 44 can be oriented perpendicular or substantially perpendicular (e.g. in one case within +/−10° of perpendicular, or within +/−5° or +/−1°) using best fit methods as noted above to measure the appropriate angles) to the associated adjacent (closest) portion of the anti-fracture score line 28 and/or main score line 26 and/or tangent line 48. However, if desired in some cases the control score line 44 can be rotated about its center point, from the illustrated configuration, to vary the effect of the control score line 44 upon tearing of the main score line 26. In addition, while the control score line 44 is shown positioned radially inside the main score line 26, if desired and if the end cap 10 geometry so permits, the control score line 44 can be positioned radially outside the main score line 26.

Figure 6:
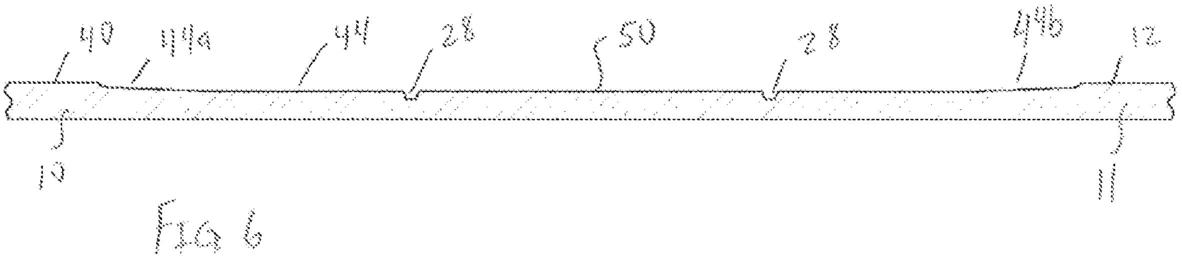
FIG. 6 is a cross section taken along line 6-6 of FIG. 4.

As best shown in FIGS. 4 and 6, the control score line 44 can have a tapered depth portion at or forming one or both ends 44*a*, 44*b* thereof. The tapered depth portions 44*a*, 44*b* can be arranged such that the control score line 44 has a shallower depth at the ends 44*a*, 44*b* thereof and tapers (relatively to an upper/planar surface of the end cap 10/end cap body 11), at a relatively sharp and then relatively shallow angle in one case (which can reduce stress induced into the material of the end cap 10 of the formation of the control score line 44 over a relatively broad area), to a deeper depth at a center portion of the control score line 44. In one case the average/total angle of taper along the length of the ends 44*a*, 44*b* is between about 1° and about 10°, but the angle can vary as desired.

The tapered depth portions at the ends 44*a*, 44*b* can extend in one case a length of between about twenty five percent and about forty percent of an entire length of the control score line 44. The tapered depth portions 44*a*, 44*b* of the control score line 44 can aid in formation of the control score line 44 by reducing tension induced into the surrounding areas of the end cap 10/end cap body 11. However tapered depths portions 44*a*, 44*b* are optional and can be omitted if desired.

During opening of the flap area 40, the end cap 10/end cap body 11/flap area 40 is designed to tear along the main score line 26. In particular, the main score line 26 is typically initially severed at location aligned (in the left-to-right direction of FIGS. 1 and 2) with at the tip 32 of the tab 30 and/or the rivet 34, and (primarily) initially moves in a left-to-right direction, as shown by the arrow 51 of FIG. 2. As the fracturing or tearing of the main score line 26 approaches the control score line 44, it is believed that material of the end cap 10 is urged at least partially toward and/or into the main score line 26 by the nature and positioning of the control score line 44, which slows tearing along the main score line 26, without entirely stopping tearing along the main score line 26. The greatest amount of deformation of material into the main score line 26 by the control score line 44 can occur at the location adjacent/aligned with the center 50, and/or the location of the main score line 26 closest to the control score line 44. The relatively shallow depth and/or relatively wide width of the control score line 44 helps to ensure that the control score line 44 does not compromise the strength of the end cap 10 in the area of the control score line 44, but allows sufficient material to be deformed into the main score line 26 during opening of the flap 40.

In this manner, as the tearing of the main score line 26 propagates in the downstream direction, the control score line 44 smoothly and progressively slows the tearing of the main score line 26 to a maximum value at location 50, and thereafter smoothly and progressively removes the slowing effect. Thus the control score line 44 provides smooth, efficient, controlled and predictable slowing of tearing of the main score line 26, reducing any undesired upward deflection of the flap 40. In particular, without the control score line 44 the flap 40 may project upwardly (instead of downwardly) when internal pressure in the container is rapidly released, causes rapid tearing along the length of the main score line 26, instead of the desired downward deflection of the flap 40.

The tapered end portions 44*a*, 44*b* of the control score line 44 can also contribute to smooth and controlled slowing of the tearing of the main score line 26. The shallower ends at the tapered end portions 44*a*, 44*b* are more easily deformed and thus can lead to a cascading or "rolling" effect where the control score line 44 is deformed greater amounts along its length with a lesser force compared to a situation where the tapered end portions 44*a*, 44*b* were not present. As noted above, the tapered nature of the end portions 44*a*, 44*b* can also reduce stresses caused by the formation of the control score line 44 over a relatively broad surface area.

The control score line 44 can be positioned relatively close to the end/tip 32 of the tab 30, so that the control score line 44 interacts with the main score line 26 relatively early in the opening process. Thus in one case the portion of the main score line 26 positioned closest to the control score line 44 is located within the first 25% of fracturing or tearing of the main score line 26 when the tab 30 is opened.

Figure 7:
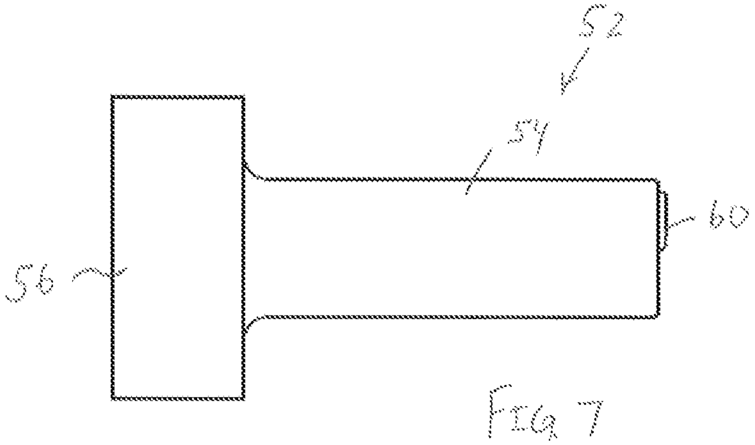
FIG. 7 is a side view of a tool that can be used to form the control score line of FIGS. 2 and 4.
Figure 8:
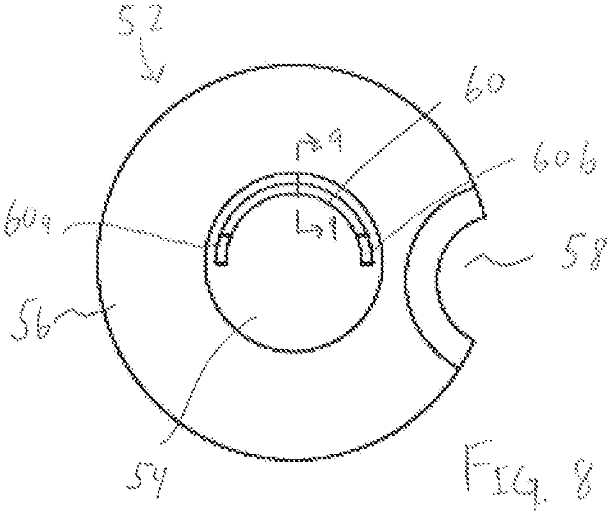
FIG. 8 is an end view of the tool of FIG. 7.
Figure 9:
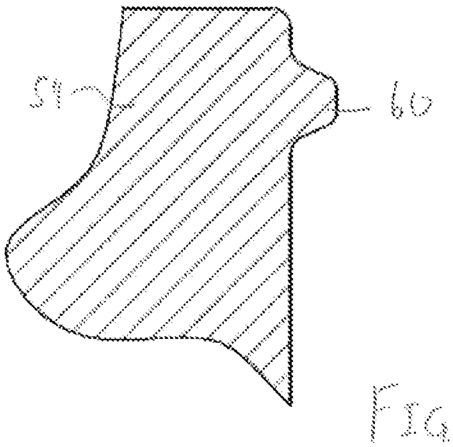
FIG. 9 is a detail cross section taken along line 9-9 of FIG. 8.

FIGS. 7-9 illustrate a tool 52, in the form of a punch, that can be used to form the control score line 44 shown in FIGS. 1, 2 and 4-6. The tool 52 includes a tool body in one case in the form of generally cylindrical stem 54 and a generally cylindrical, enlarged head 56 with a notch 58 formed on one side for proper orientation of the tool 52 and/or to prevent rotation of the tool 52 during use. The stem 54 carries a protrusion 60 thereon shaped to correspond to the control score line 44 described above. Thus in one case the protrusion 60 is semicircular with tapered ends 60*a*, 60*b* that can be punched into the end cap 10 to form the control score line 44. During formation of the control score line 44, the underside of the end cap 10 in the region of the control score line 44 can be positioned on a generally flat supporting surface or anvil surface as the punch 52 is moved into contact with the upper side of the end cap 10 to form the control score line 44. The protrusion 60 can thus have properties to enable formation of the control score line 44, in its various embodiments as described above.

In order to form the end cap of FIGS. 1-6, a starting piece of sheet-like material can be provided. The end cap body 11 can be stamped, molded, machined, or otherwise modified to have the countersink groove 14, outer curl portion 16 and deboss panel 18, and other components/properties outlined above. The main score line 26 and anti-fracture score line 28 can then be formed in the end cap 10/end cap body 11, such as by using tools/punches having protrusions in the shape of the main score line 26 and anti-fracture score line 28. The control score line 44 can then be formed in the end cap 10, in one case using the punch 52 as outlined above. Of course, the order of operations of forming one or more components of the end cap 10 can be varied from that outlined above.

Once the end cap 10 is formed, it can be coupled to the container body, such as by seaming the outer curl portion 16 to the upper edge/flange of the container body. A bottom can be coupled to the container body, if not already coupled to the container body, and the container can be filled with a fluid and sealed.

Having described the invention in detail and by reference to certain embodiments, it will be apparent that modifications and variations thereof are possible without departing from the scope of the invention.

What is claimed is:

1. An end cap comprising:

an end cap body made of a metal material;

a main score line formed in the end cap body and defining a flap area, wherein the main score line forms a nearly closed loop defining a hinge area about which the flap area is hingeable when the main score line is torn along its length;

an anti-fracture score line formed in the end cap body and oriented substantially parallel to the main score line;

a tab coupled to the end cap body and having an end positioned adjacent to the flap area; and a control score line positioned adjacent to the main score line, wherein the control score line intersects the anti-fracture score line, wherein the control score line is curved or arcuate along at least part of its length, and has end portions that are parallel or substantially parallel.

2. An end cap comprising:

an end cap body made of a metal material;

a main score line formed in the end cap body and defining a flap area;

a tab coupled to the end cap body and having an end positioned adjacent to the flap area; and a control score line positioned adjacent to the main score line, wherein the control score line is curved or arcuate along at least part of its length, and has end portions that are parallel or substantially parallel, wherein the control score line is positioned sufficiently close to the main score line such that the control score line provides a retarding effect upon tearing of the main score line.

3. The end cap of claim 2 further including an anti-fracture score line formed in the end cap body and oriented substantially parallel to the main score line, and wherein the control score line intersects the anti-fracture score line, and wherein the control score line does not intersect the main score line.

4. The end cap of claim 2 wherein the control score line has at least one of an average, median or deepest depth between about 20% and about 40% of the corresponding average, median or deepest depth of the main score line.

5. The end cap of claim 2 wherein the control score line has a width greater than a width of the main score line.

6. The end cap of claim 2 wherein the end cap body has a thickness of between about $6/1000$" and about $10/1000$", wherein the tab is coupled to the end cap body by a rivet, and wherein the tab is pivotable about the rivet in a direction perpendicular to a plane of the end cap body such that the end of the tab is pressable into the flap area to cause the main score line to tear along its length.

7. The end cap of claim 2 wherein the control score line is arcuate along its entire length.

8. The end cap of claim 2 wherein the control score line extends at least about 120 degrees in top view.

9. The end cap of claim 2 wherein each end portion of the control score line is oriented perpendicular or substantially perpendicular to an associated adjacent portion of the main score line.

10. The end cap of claim 2 wherein the control score line is semicircular in top view, and configured such that a tangent line of a center of the semicircle along a length of the semicircle is substantially parallel to a portion of the main score line adjacent to the center of the semicircle along its length.

11. The end cap of claim 2 wherein the control score line has a tapered depth portion at at least one end thereof, wherein the tapered depth portion has a variable depth along a length thereof.

12. The end cap of claim 11 wherein the at least one tapered depth portion has at least one of an average or total angle along its length of between about 1 degree and about 10 degrees relative to a plane of the end cap body.

13. The end cap of claim 11 wherein the at least one tapered depth portion extends a length of between about twenty five percent and about forty percent of a total length of the control score line.

14. The end cap of claim 2 wherein the control score line has a tapered depth portion at both ends thereof.

15. The end cap of claim 2 wherein the control score line is positioned such that a shortest distance between the control score line and the main score line is less than about $40/1000$".

16. An end cap comprising:

an end cap body made of a piece of relatively flat and planar metal material;

a main score line formed in the end cap body and defining a flap area;

a tab coupled to the end cap body and having an end positioned adjacent to the flap area; and a control score line positioned adjacent to the main score line, wherein the control score line is positioned sufficiently close to the main score line such that the control score line provides a retarding effect upon tearing of the main score line, wherein the control score line is curved or arcuate along at least part of its length, wherein the control score line has a portion having a variable depth along the length of the control score line at at least one end thereof, and wherein the control score line has a portion not having a variable depth along a different portion of the length of the control score line.

17. The end cap of claim 16 wherein the control score line has a portion at both ends thereof having a variable depth along the length of the control score line, wherein the end portions are parallel or substantially parallel, and wherein the main score line forms a nearly closed loop defining a hinge area about which the flap is hingeable when the main score line is torn along its length.

18. The end cap of claim 16 wherein the control score line has a portion at both ends thereof having a variable depth along the length of the control score line, and wherein the portions together extend a length of between about twenty five percent and about forty percent of an entire length of the control score line.

19. The end cap of claim 16 wherein the control score line has a depth that tapers at a relatively sharp angle at an end thereof and then at a relatively shallow angle at a location away from the end.

20. A method for forming an end cap comprising:

accessing an end cap body made of a metal material;

forming a main score line in the end cap body thereby defining a flap area, wherein the main score line forms a nearly closed loop defining a hinge area about which the flap is hingeable when the main score line is torn along its length;

forming a control score line adjacent to the main score line, wherein the control score line is positioned sufficiently close to the main score line such that the control score line provides a retarding effect upon tearing of the main score line, wherein the control score line is curved or arcuate along at least part of its length, and has end portions that are parallel or substantially parallel; and coupling a tab to the end cap body, the tab having an end positioned adjacent to the flap area.

21. An end cap comprising:

an end cap body made of a metal material;

a main score line formed in the end cap body and defining a flap area;

an anti-fracture score line formed in the end cap body and oriented substantially parallel to the main score line;

a tab coupled to the end cap body and having an end positioned adjacent to the flap area; and a control score line positioned adjacent to the main score line, wherein at least part of the control score line is positioned between the main score line and the anti-fracture score line, and wherein the control score line is curved or arcuate along at least part of its length, and has end portions that are parallel.

* * * * *